US010232322B2

(12) United States Patent
Park et al.

(10) Patent No.: US 10,232,322 B2
(45) Date of Patent: Mar. 19, 2019

(54) COMPOSITE SEPARATION MEMBRANE INCLUDING GRAPHENE OXIDE COATING LAYER AND METHOD FOR MANUFACTURING THE SAME

(71) Applicant: IUCF-HYU (INDUSTRY-UNIVERSITY COOPERATION FOUNDATION HANYANG UNIVERSITY), Seoul (KR)

(72) Inventors: Ho Bum Park, Seoul (KR); Hyo Won Kim, Seoul (KR); Hee Wook Yoon, Gyeonggi-do (KR); Byung Min Yoo, Gyeonggi-do (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 592 days.

(21) Appl. No.: 14/786,757

(22) PCT Filed: Sep. 27, 2013

(86) PCT No.: PCT/KR2013/008696
§ 371 (c)(1),
(2) Date: Oct. 23, 2015

(87) PCT Pub. No.: WO2014/175517
PCT Pub. Date: Oct. 30, 2014

(65) Prior Publication Data
US 2016/0074814 A1    Mar. 17, 2016

(30) Foreign Application Priority Data

Apr. 24, 2013 (KR) .................... 10-2013-0045135

(51) Int. Cl.
*B01D 53/22* (2006.01)
*B01D 71/02* (2006.01)
(Continued)

(52) U.S. Cl.
CPC ......... *B01D 71/024* (2013.01); *B01D 53/228* (2013.01); *B01D 67/0046* (2013.01);
(Continued)

(58) Field of Classification Search
CPC ............ B01D 67/0086; B01D 2325/02; B01D 67/0046; B01D 71/024; B01D 2325/08;
(Continued)

(56) References Cited

U.S. PATENT DOCUMENTS 8,148,161 B2    4/2012  Higgins et al.
9,056,282 B2 *  6/2015  Miller ............... B01D 67/0039
(Continued)

FOREIGN PATENT DOCUMENTS

KR    1020110033111    3/2011
KR    1020120109187    10/2012
(Continued)

OTHER PUBLICATIONS

Kim, S., et al., "Polysulfone and functionalized carbon nanotube mixed matrix membranes for gas separation: Theory and experiment," Journal of Membrane Society, 2007, vol. 294. pp. 147-158.
(Continued)

*Primary Examiner* — Anthony R Shumate
(74) *Attorney, Agent, or Firm* — Duane Morris LLP; J. Rodman Steele, Jr.; Gregory M. Lefkowitz

(57) ABSTRACT

The present invention relates to a composite separation membrane including a graphene oxide coating layer. The composite separation membrane of the present invention has both high carbon dioxide permeability and high selectivity for carbon dioxide over nitrogen, hydrogen or methane gas,
(Continued)

is free of surface defects, and exhibits remarkably increased selectivity for carbon dioxide over other gases (hydrogen, nitrogen, methane, etc.) without any change in carbon dioxide permeability, particularly even when exposed to water. Due to these advantages, the composite separation membrane of the present invention can be applied to industrial fields involving carbon dioxide separation and recovery processes. The present invention also relates to a method for manufacturing the composite separation membrane.

18 Claims, 7 Drawing Sheets

(51) Int. Cl.
  *B01D 69/12* (2006.01)
  *B01D 71/76* (2006.01)
  *B01D 67/00* (2006.01)
(52) U.S. Cl.
  CPC ......... *B01D 67/0086* (2013.01); *B01D 69/12* (2013.01); *B01D 71/021* (2013.01); *B01D 71/76* (2013.01); B01D 2325/02 (2013.01); B01D 2325/04 (2013.01); B01D 2325/08 (2013.01)
(58) Field of Classification Search
  CPC ................ B01D 2325/04; B01D 53/228; B01D 71/021; B01D 71/76; B01D 69/12
  See application file for complete search history.

(56) References Cited

U.S. PATENT DOCUMENTS

| | | | | |
|---|---|---|---|---|
| 9,795,931 B2* | 10/2017 | Yu | ......................... | B01D 71/024 |
| 9,833,749 B2* | 12/2017 | Park | ..................... | B01D 71/024 |
| 9,844,758 B2* | 12/2017 | Nair | ...................... | B01D 71/024 |
| 9,901,879 B2* | 2/2018 | Karnik | ................. | B01D 65/003 |
| 2012/0255899 A1 | 10/2012 | Choi et al. | | |
| 2012/0288750 A1* | 11/2012 | Kung | ....................... | H01B 1/04 429/188 |
| 2013/0213902 A1 | 8/2013 | Browne et al. | | |
| 2013/0305525 A1* | 11/2013 | He | .......................... | H01M 2/00 29/623.3 |
| 2014/0151288 A1* | 6/2014 | Miller | .................... | B01D 69/10 210/497.01 |
| 2014/0183415 A1* | 7/2014 | Song | ..................... | B82Y 30/00 252/502 |
| 2015/0053607 A1* | 2/2015 | Liu | ......................... | B01D 71/68 210/500.3 |
| 2015/0122727 A1* | 5/2015 | Karnik | .................. | B01D 53/22 210/500.21 |
| 2015/0231577 A1* | 8/2015 | Nair | ..................... | B01D 71/024 210/640 |
| 2015/0279504 A1* | 10/2015 | Viville | ................. | C09D 165/00 428/220 |
| 2016/0074814 A1* | 3/2016 | Park | ...................... | B01D 69/12 210/500.33 |
| 2016/0280563 A1* | 9/2016 | Raveendran-Nair | ....................... | B01D 71/021 |
| 2016/0297693 A1* | 10/2016 | Raveendran-Nair | ....................... | B01D 61/002 |
| 2017/0014778 A1* | 1/2017 | Park | ..................... | B01D 53/228 |
| 2017/0296706 A1* | 10/2017 | Simon | .................. | A61L 31/024 |

FOREIGN PATENT DOCUMENTS

| | | |
|---|---|---|
| KR | 1020120115821 | 10/2012 |
| KR | 1020120140214 | 12/2012 |

OTHER PUBLICATIONS

Byungkook, A.'s dissertation thesis statement entitled "Preparation and Characterization of Ultrathin Membrane Derived from Graphene Oxide", Hangyang University, Dec. 7, 2011.

* cited by examiner

[Fig. 1]
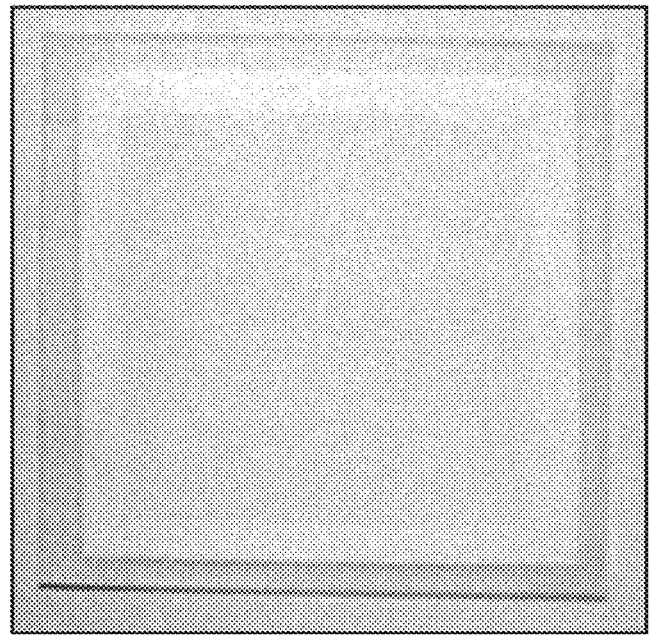
[Fig. 2]
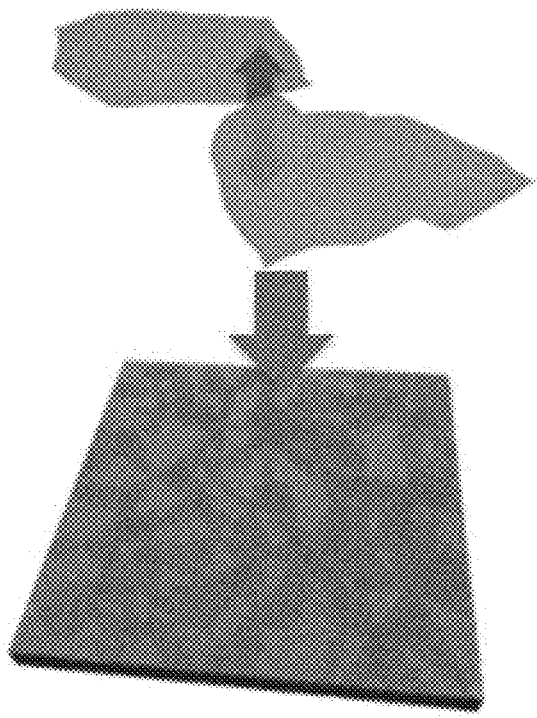

[Fig. 3]
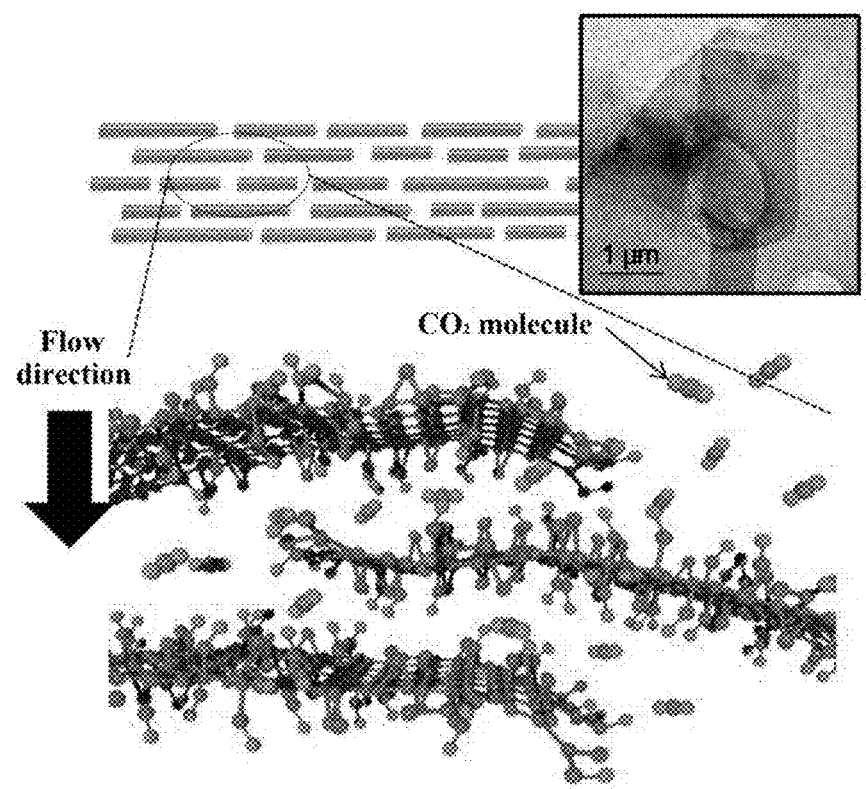

[Fig. 5]
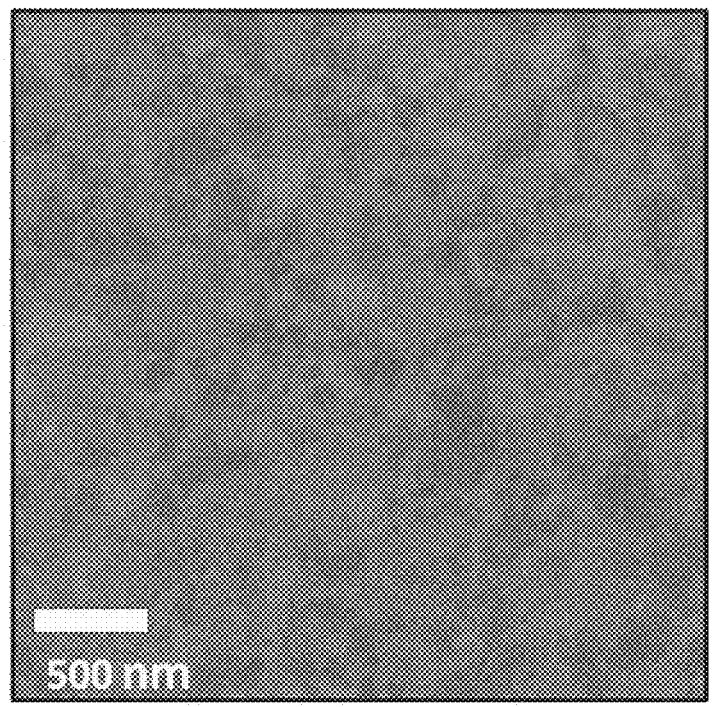
[Fig. 6]
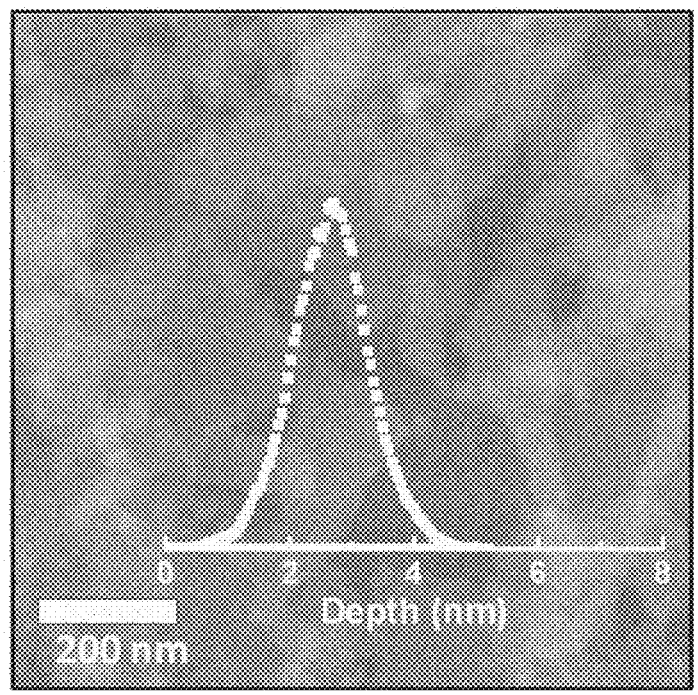

[Fig. 7]
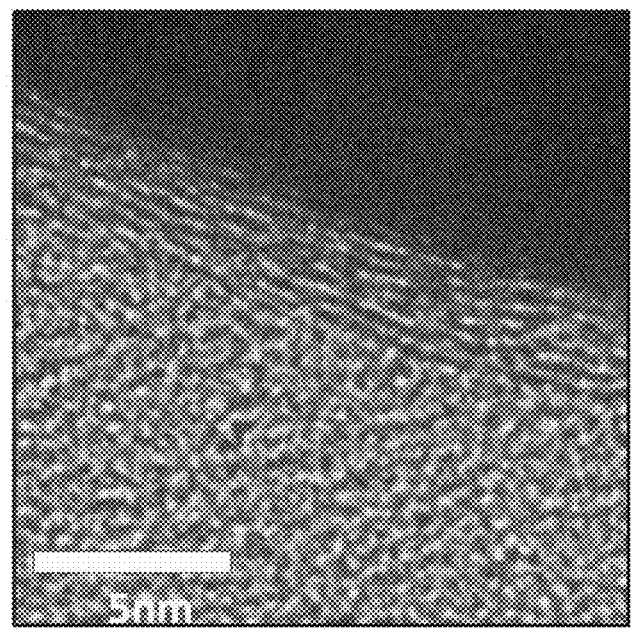
[Fig. 8]
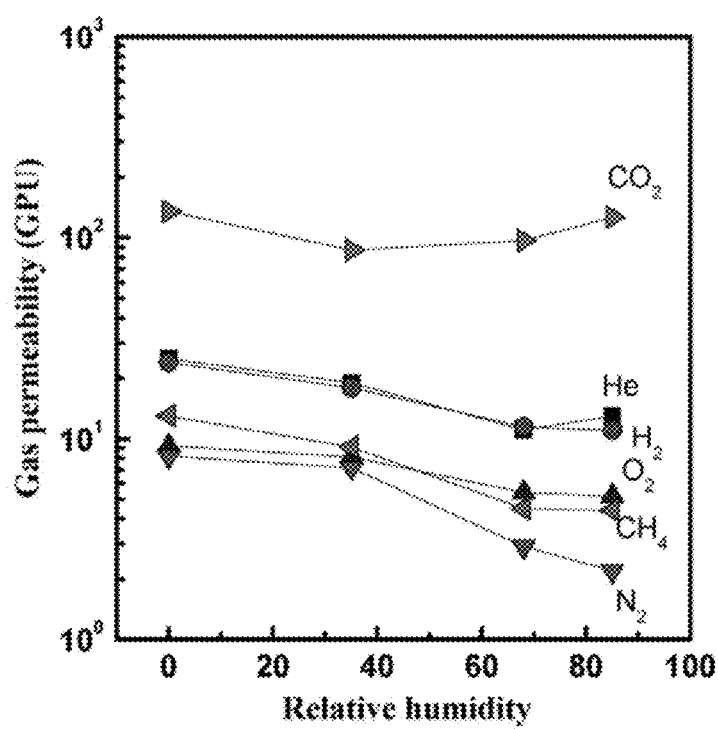

[Fig. 9]
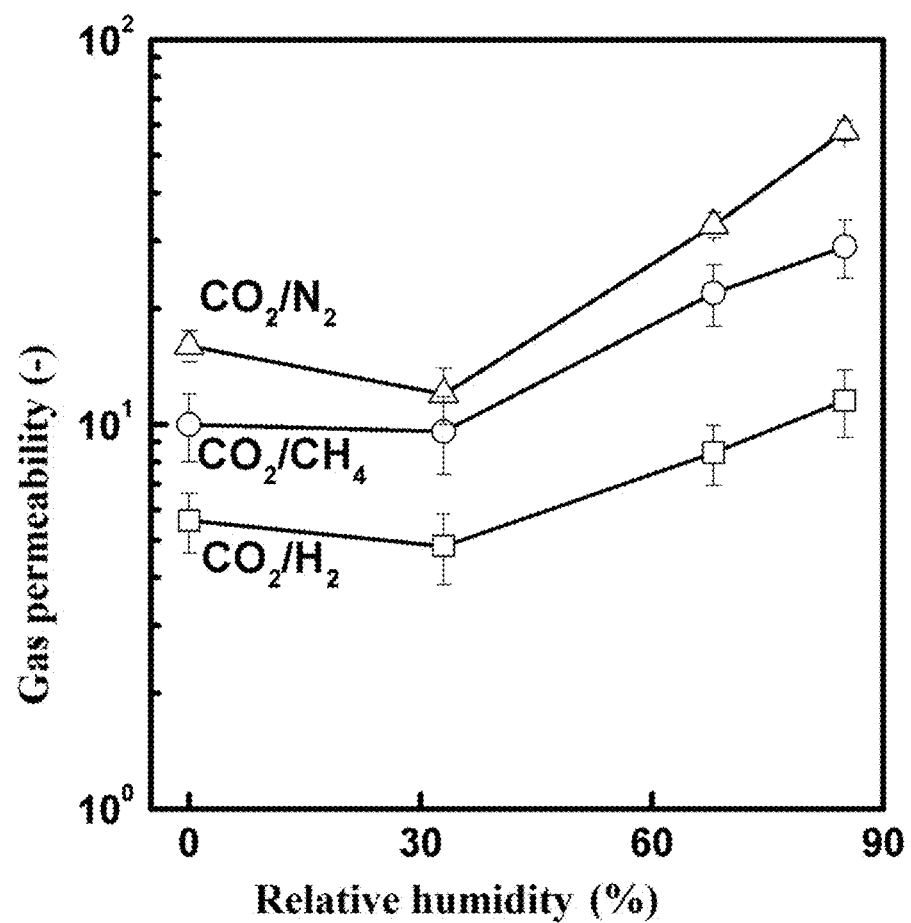

COMPOSITE SEPARATION MEMBRANE INCLUDING GRAPHENE OXIDE COATING LAYER AND METHOD FOR MANUFACTURING THE SAME

CROSS-REFERENCE TO RELATED APPLICATIONS

This application is a § 371 national stage entry of International Application No. PCT/KR2013/008696, filed Sep. 27, 2013, which claims priority to South Korean Patent Application No. 10-2013-0045135 filed Apr. 24, 2013, the entire contents of which are incorporated herein by reference.

TECHNICAL FIELD

The present invention relates to a composite separation membrane including a graphene oxide coating layer and a method for manufacturing the same. More specifically, the present invention relates to a composite separation membrane including a graphene oxide coating layer on a porous polymer support that is applicable to carbon dioxide separation and recovery processes, and a method for manufacturing the composite separation membrane.

BACKGROUND ART

Gas separation membranes capable of selective carbon dioxide separation and recovery are currently applied to various processes, such as carbon dioxide capture before and after combustion in thermal power plants, removal of carbon dioxide present in off-gases from petrochemical processes and flue gases after combustion, and natural gas and biogas purification. Particularly, gas separation membranes based on polymeric materials are required to have not only excellent thermal, chemical, and mechanical properties but also high gas permeability and selectivity for their successful application to practical industries. However, both the gas permeability and selectivity of polymeric material-based separation membranes are generally difficult to maintain at high levels because of their trade-off relationship. Thus, considerable research efforts have been directed to overcoming this difficulty.

Some conventional monolayer membranes are based on glassy polymeric materials having a high attractive force between the polymer chains do not use supports. Film formation processes for the manufacture of the monolayer membranes leave no defects (or pin holes) but the permeability of the monolayer membranes is disadvantageously low. In recent years, carbon membranes have been developed that are manufactured by final carbonization of monolayer membranes based on various polymeric materials. The carbon membranes are generally obtained by carbonization of polymer precursors in the form of films at high temperature. The high-temperature carbonization makes the carbon membranes microporous. The carbon membranes exhibit high gas permeability and selectivity and are advantageous in terms of long-term stability, durability, chemical resistance, and high-temperature stability. However, the mechanical properties (e.g., elasticity and tensile strength) of the carbon membranes are unsatisfactory and the manufacture of the carbon membranes requires a high temperature of 600 to 1,000° C. and a long time, incurring a considerable cost. Poor processability of the carbon membranes resulting from difficulty in thin film formation is an obstacle to the commercialization of the carbon membranes. Another serious problem of the carbon membranes is that defects may be formed during film formation processes. For example, carbon membranes manufactured by carbonization of hollow fiber membranes made of cellulose esters are known to have improved carbon dioxide permeability and selectivity for carbon dioxide over methane gas but are still insufficient in solving the above-mentioned problems, including defect formation, on account of their characteristics (Patent Document 1: Korean Patent Publication No. 2011-0033111).

Since it was reported that carbon nanotube films have high gas permeability and selectivity, unlike traditional monolayer membranes and carbon membranes, considerable research has been conducted on composite membranes in which carbon nanotubes are mixed inside a polymer matrix. For example, a composite membrane for gas separation is known in which single walled carbon nanotubes functionalized with long-chain alkyl amines are mixed inside a polysulfone matrix to facilitate dispersion of the carbon nanotubes in the polymer (Non-Patent Document 1: Sangil Kim et al., J. Membr. Sci. 294 (2007) 147-158). The composite membrane is also known to have improved carbon dioxide permeability compared to polysulfone monolayer membranes. However, the composite membrane exhibits lower selectivity for carbon dioxide over methane gas than polysulfone monolayer membranes, and as a result, the trade-off relationship between the gas permeability and selectivity of the composite membrane still remains unsolved to a satisfactory level.

Recent attention has been paid to graphene materials that have 2-dimensional planar monolayer structures, exhibit high mechanical strength and excellent thermal and chemical properties, and can be formed into thin films. For example, a composite membrane manufactured by the transfer of graphene to a porous polymer support is known (Patent Document 2: U.S. Patent Publication No. 2012-0255899). The use of the graphene-containing composite membrane enables the separation of oxygen from a nitrogen-oxygen mixed gas, leading to oxygen enrichment or nitrogen production. However, despite the expectation that the graphene thin film will improve the gas permeability and selectivity of the composite membrane, the formation of some defects on the membrane surface cannot be avoided, and as a result, the permeability of carbon dioxide is considerably lower than those of other gases, such as helium, hydrogen, oxygen, nitrogen, and methane.

Polymer separation membranes and carbon separation membranes are generally used in practical processes for carbon dioxide separation. The separation membranes contain many impurities, particularly water. When the separation membranes are exposed to water during gas permeation, the permeabilities of gases (particularly carbon dioxide) through the separation membranes tend to decrease gradually. This problem associated with exposure to water needs to be solved.

DETAILED DESCRIPTION OF THE INVENTION

Problems to be Solved by the Invention

The present invention has been made in view of the above problems and an object of the present invention is to provide a composite separation membrane that has both high carbon dioxide permeability and high selectivity for carbon dioxide over nitrogen, hydrogen or methane gas, is free of surface defects, and exhibits improved selectivity for carbon dioxide without losing its high carbon dioxide permeability even when exposed to water during gas permeation, and a method for manufacturing the composite separation membrane.

Means for Solving the Problems

One feature of the present invention provides a composite separation membrane including a porous polymer support and a graphene oxide coating layer formed on the porous polymer support.

The coating layer consists of a plurality of graphene oxide layers, each of which includes pores through which gases pass.

The pores included in one of the graphene oxide layers are spaced at an average distance of 0.5 to 1.0 nm apart from the pores present in the graphene oxide layers formed on one or both sides of the one of the graphene oxide layers.

The pores have an average diameter of 0.5 to 1.0 nm.

The porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

The porous polymer support includes pores whose size is in the range of 10 nm to 100 nm.

The graphene oxide has a size in the range of 0.1 μm to 5 μm.

The graphene oxide is functionalized graphene oxide prepared by the conversion of the hydroxyl, carboxyl, carbonyl or epoxy groups present in the graphene oxide to ester, ether, amide or amino groups.

The graphene oxide coating layer has a thickness of 3 to 20 nm.

A further feature of the present invention provides a method for manufacturing a composite separation membrane, including: 1) dispersing graphene oxide in distilled water to obtain a dispersion; and 2) coating the dispersion on a porous polymer support to form a coating layer.

The concentration of the graphene oxide in the dispersion obtained in step 1) is from 0.5 to 1.5 g/L.

The coating is performed by spin coating.

The coating layer formed in step 2) has a thickness of 3 to 20 nm.

The method further includes subjecting the dispersion to ultrasonic disruption after step 1).

The porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

The porous polymer support includes pores whose size is in the range of 10 nm to 100 nm.

The graphene oxide has a size in the range of 0.1 μm to 5 μm.

The graphene oxide is functionalized graphene oxide prepared by the conversion of the hydroxyl, carboxyl, carbonyl or epoxy groups present in the graphene oxide to ester, ether, amide or amino groups.

Another feature of the present invention provides a membrane for water treatment including the composite separation membrane.

Another feature of the present invention provides a memory device including the composite separation membrane.

Yet another feature of the present invention provides an electrode material including the composite separation membrane.

Effects of the Invention

The composite separation membrane of the present invention, which includes a graphene oxide coating layer, has both high carbon dioxide permeability and high selectivity for carbon dioxide over nitrogen, hydrogen or methane gas, is free of surface defects, and exhibits remarkably increased selectivity for carbon dioxide over other gases (hydrogen, nitrogen, methane, etc.) without any change in carbon dioxide permeability, particularly even when exposed to water. Due to these advantages, the composite separation membrane of the present invention can be applied to industrial fields involving carbon dioxide separation and recovery processes.

BRIEF DESCRIPTION OF THE DRAWINGS

FIG. 1 is an image of a composite separation membrane including graphene oxide, which was manufactured in Example 1.

FIG. 2 is a schematic diagram showing a predicted structure of overlapping graphene oxide flakes deposited on one another.

FIG. 3 is a schematic diagram showing the permeation of a gas through a composite separation membrane including graphene oxide manufactured in Example 1.

FIG. 5 is a SEM image of a composite separation membrane including graphene oxide manufactured in Example 1, FIG. 6 is an AFM image of a composite separation membrane including graphene oxide manufactured in Example 1.

FIG. 7 is a TEM image of a composite separation membrane including graphene oxide manufactured in Example 1.

FIG. 8 is a graph showing the gas permeabilities of a composite separation membrane including graphene oxide manufactured in Example 1 at different relative humidities.

FIG. 9 is a graph showing the selectivities of a composite separation membrane manufactured in Example 1 for carbon dioxide at different relative humidities.

BEST MODE FOR CARRYING OUT THE INVENTION

Figure 4A:
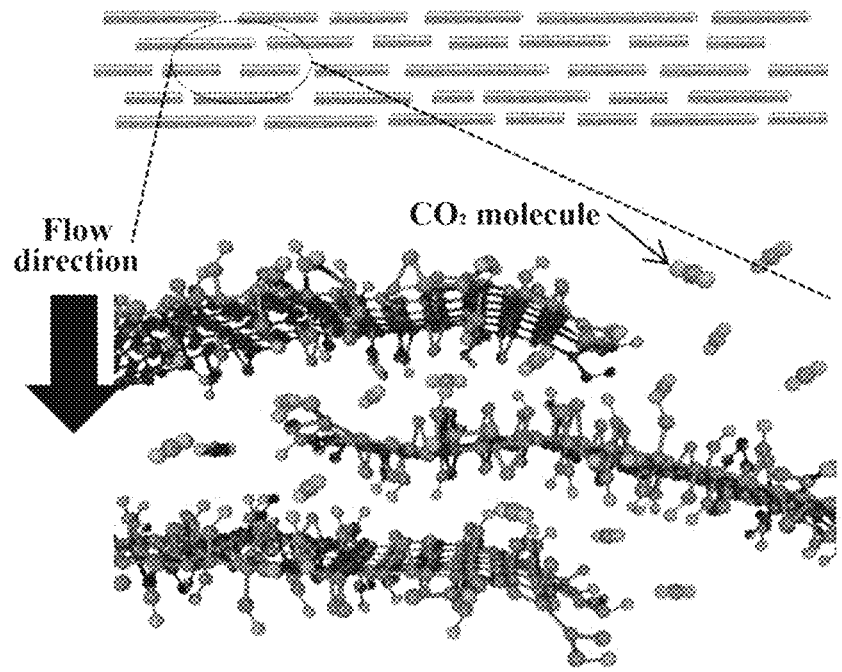
FIG. 4(a) is a cross-sectional diagram of a composite separation membrane manufactured by spin coating in Example 1.

The present inventors have earnestly and intensively conducted research to develop a composite separation membrane that has both high gas permeability and selectivity, particularly even when exposed to water, and a method for manufacturing the composite separation membrane, and finally arrived at the present invention.

Specifically, the present invention provides a composite separation membrane including a porous polymer support and a graphene oxide coating layer formed on the porous polymer support.

The presence of the graphene oxide coating layer on the porous polymer support allows a particular gas to selectively penetrate through the composite separation membrane in an effective and economical manner. In addition, the graphene oxide coating layer is highly processable and the thickness or graphene oxide concentration thereof can be controlled such that a particular gas selectively penetrates through the composite separation membrane. Furthermore, the graphene oxide coating layer can be formed in the form of an ultrathin film because there is no additional element to be bound to the composite separation membrane. Particularly, the graphene oxide coating layer has high adsorptivity for gases, particularly carbon dioxide.

The coating layer consists of a plurality of graphene oxide layers, each of which includes pores through which gases pass.

The pores included in one of the graphene oxide layers are spaced apart from the pores present in the graphene oxide layers formed on one or both sides of the one of the graphene oxide layers. The average distance between the pores of the adjacent graphene oxide layers is preferably from 0.5 to 1.0 nm. If the average distance is shorter than 0.5 nm, the selective permeability of the coating layer for a particular gas is undesirably lowered. Meanwhile, if the average distance is longer than 1.0 nm, the gas permeability of the coating layer is considerably deteriorated. Particularly, when the average distance is in the numerical range defined above, the carbon dioxide permeability of the coating layer and the selectivity of the coating layer for carbon dioxide over nitrogen, hydrogen or methane gas are markedly improved. When the average distance is maintained at 0.5 to 1.0 nm, the pores of the graphene oxide layers are regularly arranged in a zigzag configuration. With this configuration, high gas permeability and selectivity are achieved and the coating layer exhibits high selectivity for carbon dioxide over nitrogen, hydrogen or methane gas even when exposed to water.

Preferably, the pores present in the graphene oxide coating layer have an average diameter in the range of 0.5 to 1.0 nm. Within this range, the coating layer exhibits high selectivity for carbon dioxide even when exposed to water.

The porous polymer support can function as a reinforcing material to support the coating layer. The porous polymer support is in contact with the coating layer and is made of a polymeric material having pores whose size is large enough for a gas to penetrate therethrough. Specifically, the porous polymer support is made of a polymer selected from the group consisting of, but not limited to, polysulfone, polyethersulfone, polyimide, polyetherimide, polyamide, polyacrylonitrile, cellulose acetate, cellulose triacetate, and polyvinylidene fluoride. Polyethersulfone is more preferred as a material for the support.

Preferably, the porous polymer support is microporous with a pore size in the range of 10 nm to 100 nm. Within this range, gas permeation resistance at the bottom of the separation membrane can be minimized and the overall permeability of the composite membrane can be improved by controlling the surface porosity and bulk porosity of the polymer support.

Graphene oxide can be prepared on a large scale by oxidizing graphite with as an oxidizing agent and includes hydrophilic functional groups, such as hydroxyl, carboxyl, carbonyl or epoxy groups. The majority of graphene oxide is currently prepared by the Hummers method [Hummers, W.S. & Offeman, R.E. Preparation of graphite oxide. J. Am. Chem. Soc. 80. 1339 (1958)] or its partially modified Hummers methods. Graphene oxide obtained by a modified Hummers method is used in the present invention. The gas permeability of the coating layer can be controlled by varying the size of the graphene oxide. If the graphene oxide is larger in size than 5 μm, the coating layer exhibits barrier properties. In contrast, as the size of the graphene oxide decreases from 5 μm to 0.1 μm, the gas permeability of the coating layer is gradually increased to a level suitable for gas separation. Thus, the size of the graphene oxide is preferably adjusted to the range of 0.1 μm to 5 μm, more preferably 0.3 μm to 1 μm.

In the present invention, functionalized graphene oxide may also be used. The functionalized graphene oxide can be prepared by chemical reaction of the graphene oxide with another compound to convert the hydrophilic functional groups present in the graphene oxide, such as hydroxyl, carboxyl, carbonyl or epoxy groups, to ester, ether, amide or amino groups. For example, the carboxyl groups of the graphene oxide may be converted to ester groups by reaction of the graphene oxide with an alcohol, the hydroxyl groups of the graphene oxide may be converted to ether groups by reaction of the graphene oxide with an alkyl halide, the carboxyl groups of the graphene oxide may be converted to amide groups by reaction of the graphene oxide with an alkyl amine, or the epoxy groups of the graphene oxide may be converted to amino groups by ring-opening reaction of the graphene oxide with an alkyl amine.

The coating layer may consist of one or more layers of the graphene oxide. The thickness of each graphene oxide layer is preferably from 0.6 nm to 1 nm.

The thickness of the graphene oxide coating layer is preferably from 3 to 20 nm. If the coating layer is thinner than 3 nm, the gas permeability of the coating layer is lowered due to the insufficient amount of the graphene oxide coated. Meanwhile, if the coating layer is thicker than 20 nm, the excessively large amount of the graphene oxide coated increases the amount of carbon dioxide to be adsorbed to the coating layer, leading to low selectivity for carbon dioxide.

The composite separation membrane of the present invention has high selectivity for carbon dioxide. In addition, the composite separation membrane of the present invention has high selectivity for carbon dioxide over one or more gases selected from the group consisting of hydrogen, nitrogen, and methane. The selectivity of the composite separation membrane for carbon dioxide over one or more gases selected from the group consisting of hydrogen, nitrogen, and methane increases markedly with increasing humidity. In conclusion, the composite separation membrane of the present invention has high selectivity for carbon dioxide despite exposure to water.

A further feature of the present invention provides a method for manufacturing a composite separation membrane, including: 1) dispersing graphene oxide in distilled water to obtain a dispersion; and 2) coating the dispersion on a porous polymer support to form a coating layer.

The formation of the coating layer by coating the dispersion of graphene oxide in distilled water on the porous polymer support leads to a significant increase in the selectivity of the final composite separation membrane, particularly high selectivity of the composite separation membrane for carbon dioxide over one or more gases selected from the group consisting of hydrogen, nitrogen, and methane. The selectivity of the composite separation membrane for carbon dioxide over one or more gases selected from the group consisting of hydrogen, nitrogen, and methane increases markedly with increasing humidity. In conclusion, the composite separation membrane has high selectivity for carbon dioxide despite exposure to water.

The concentration of the graphene oxide in the dispersion obtained in step 1) is preferably from 0.5 to 1.5 g/L. If the graphene oxide is present at a concentration of less than 0.5 g/L, an improvement in selectivity is difficult to expect. Meanwhile, if the graphene oxide is present at a concentration exceeding 1.5 g/L, the amount of carbon dioxide to be adsorbed increases, undesirably resulting in low permeability.

In step 2), the coating is performed by any suitable coating process that can increase the gas permeability and selectivity of the composite separation membrane. Spin coating or spray coating is preferred and spin coating is more preferred. Spin coating is a coating process based on the application of a rotational force and contributes to a significant increase in the selectivity of the composite separation membrane. There is no particular restriction on conditions for the spin coating. Preferably, the graphene oxide solution having a concentration of 0.5 to 1.5 g/L is coated at 2,000 to 4,000 rpm for 15 to 60 seconds. The graphene oxide solution is coated in divided amounts (each 0.5 to 1.5 mL) 3 to 10 times. Immediately after the coating, the solvent is volatilized by the rotational force. Depending on the number of times of the spin coating, the resulting graphene oxide layers are stacked to form the graphene oxide coating layer. The graphene oxide coating layer includes pores having an average diameter of 0.5 to 1.0 nm. The pores included in one of the graphene oxide layers are spaced apart from the pores present in the graphene oxide layers formed on one or both sides of the one of the graphene oxide layers. The average distance between the pores of the adjacent graphene oxide layers is preferably from 0.5 to 1.0 nm. If the average distance is shorter than 0.5 nm, the selective permeability of the coating layer for a particular gas is undesirably lowered. Meanwhile, if the average distance is longer than 1.5 nm, the gas permeability of the coating layer is considerably deteriorated. Particularly, when the average distance is in the numerical range defined above, the carbon dioxide permeability of the coating layer and the selectivity of the coating layer for carbon dioxide are markedly improved. In conclusion, the average distance between the pores present in the graphene oxide layers is maintained constant by the spin coating, achieving high selectivity. In contrast, according to other coating processes, the average distance is reduced below the range defined above (0.5 to 1.0 nm), resulting in low selectivity. Therefore, the spin coating provides a solution to the cause of the problem encountered in the use of other coating processes.

The thickness of the coating layer formed in step 2) is preferably from 3 to 20 nm. If the coating layer is thinner than 3 nm, the gas permeability of the coating layer is lowered due to the insufficient amount of the graphene oxide coated. Meanwhile, if the coating layer is thicker than 20 nm, the excessively large amount of the graphene oxide coated increases the amount of carbon dioxide to be adsorbed to the coating layer, leading to low selectivity for carbon dioxide.

Preferably, the method further includes subjecting the dispersion to ultrasonic disruption after step 1). The ultrasonic disruption can improve the dispersibility of the graphene oxide in the dispersion.

The porous polymer support is preferably made of a polymer selected from the group consisting of polysulfone, polyethersulfone, polyimide, polyetherimide, polyamide, polyacrylonitrile, cellulose acetate, cellulose triacetate, and polyvinylidene fluoride.

In the present invention, functionalized graphene oxide may also be used. The functionalized graphene oxide can be prepared by chemical reaction of the graphene oxide with another compound to convert the hydrophilic functional groups present in the graphene oxide, such as hydroxyl, carboxyl, carbonyl or epoxy groups, to ester, ether, amide or amino groups.

The coating layer may consist of one or more layers of the graphene oxide. The thickness of each graphene oxide layer is preferably from 0.6 nm to 1 nm.

Other features of the present invention provide a membrane for water treatment, a memory device, and an electrode material, each of which includes the composite separation membrane. The membrane for water treatment, the memory device, and the electrode material may be fabricated by suitable methods known in the art.

MODE FOR CARRYING OUT THE INVENTION

The present invention will be explained in detail in such a manner that those with ordinary knowledge in the art can easily carry out the invention with reference to the following examples. The invention may, however, be embodied in many different forms and should not be construed as limited to the exemplary embodiments set forth herein.

EXAMPLE 1

800 mL of a 1.0 g/L aqueous solution of graphene oxide (Bay Carbon and Sigma Aldrich) was prepared. The graphene oxide solution was adjusted to pH 10.0 using a 1 M aqueous NaOH solution and was subjected to ultrasonic disruption for 3 h to obtain a homogeneous dispersion. Thereafter, 5 ml of the dispersion was spin coated on a polyethersulfone porous polymer support. The dispersion was coated in 5 equally divided amounts (each 1 mL) at 3,000 rpm for 30 sec to manufacture a final composite separation membrane including the graphene oxide.

Figure 4B:
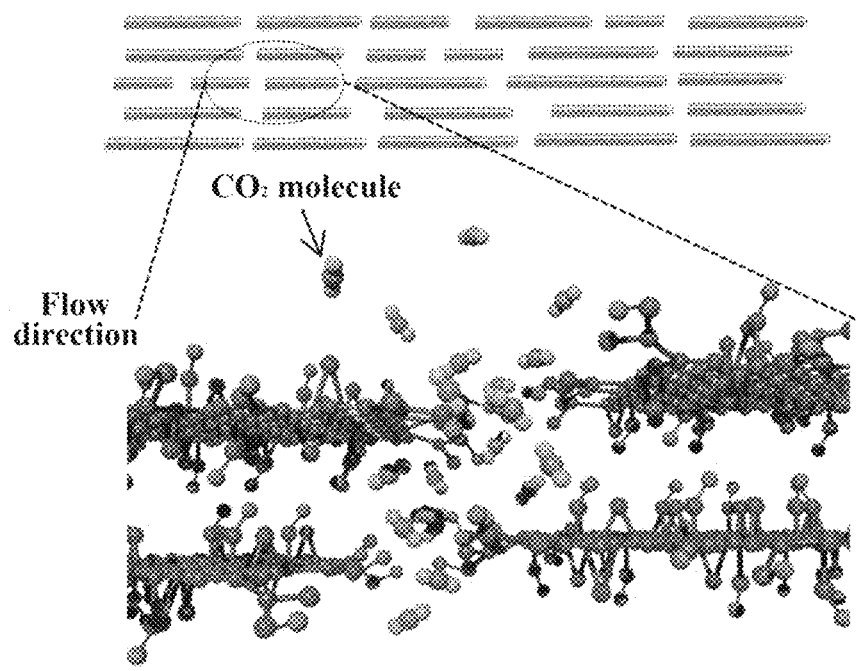
FIG. 4(b) is a cross-sectional diagram of a composite separation membrane manufactured by a conventional coating process.

FIG. 1 is an image of the composite separation membrane including coated graphene oxide, FIG. 2 is a schematic diagram showing a predicted structure of overlapping graphene oxide flakes deposited on one another, and FIG. 3 is a schematic diagram showing the permeation of a gas through the composite separation membrane including graphene oxide. FIG. 4 compares cross-sectional diagrams of (a) the composite separation membrane manufactured by spin coating in Example 1 and (b) a composite separation membrane manufactured by a conventional coating process in Comparative Example 1. These diagrams demonstrate higher selectivity of the composite separation membrane manufactured in Example 1 than that of the composite separation membrane manufactured in Comparative Example 1. FIGS. 5 and 6 are SEM and AFM images of the composite separation membrane including graphene oxide manufactured in Example 1. The image of FIG. 6 shows that the graphene oxide flakes overlapped and were deposited on one another. FIG. 7 is a TEM image of the composite separation membrane manufactured in Example 1. The image of FIG. 7 shows that the graphene oxide flakes overlapped and were deposited on one another and the coating layer was about 5 nm thick. Based on these results, it was confirmed that the average distance between the pores present in the graphene oxide layers of the composite separation membrane manufactured in Example 1 was from 0.5 to 1.0 nm, which is larger than those in the case of existing composite separation membranes. The larger average distance leads to a marked improvement in gas permeability and selectivity. This decreases the probability that the pores present in the graphene oxide layers overlap each other, which is because the spin coating allowed the pores to be regularly arranged in a zigzag configuration at an average spacing of 0.5-1.0 nm without overlapping.

COMPARATIVE EXAMPLE 1

A composite separation membrane was manufactured in the same manner as in Example 1, except that vacuum filtration and direct evaporation were performed instead of spin coating.

EXPERIMENTAL EXAMPLES

Experimental Example 1

Measurement of Gas Permeabilities and Selectivities of the Composite Membrane Including Coated Graphene Oxide The gas permeabilities and selectivities of the composite separation membrane manufactured in Example 1 were measured by a constant pressure/variable volume method. The results are shown in FIGS. 8 and 9.

As can be seen from FIG. 8, the composite separation membrane including coated graphene oxide showed considerably increased gas permeabilities. Particularly, FIG. 9 shows high selectivities of the composite separation membrane for carbon dioxide due to the selective permeation of carbon dioxide through the composite separation membrane. FIGS. 8 and 9 show the gas permeability and selectivity of the composite separation membrane at different relative humidities, respectively. Conventional carbon dioxide separation processes using separation membranes involve the removal of impurities (including water) from carbon dioxide and other gases to be separated. This water removal is necessary for various reasons, for example, for prolonging the lifetime of the separation membranes. In contrast, the composite separation membrane of Example 1 showed high gas permeabilities and selectivities despite the presence of water, as shown in FIGS. 8 and 9.

On the other hand, the composite separation membrane of Example 1 showed superior gas permeability and selectivity compared to the composite separation membrane of Comparative Example 1.

Experimental Example 2

Measurement of Gas Permeabilities and Selectivities of the Composite Membranes Manufactured by Different Coating Processes The gas permeabilities and selectivities of the composite separation membranes manufactured by different coating processes in Example 1 and Comparative Example 1 were measured. The results are shown in FIG. 10.

Figure 10A:
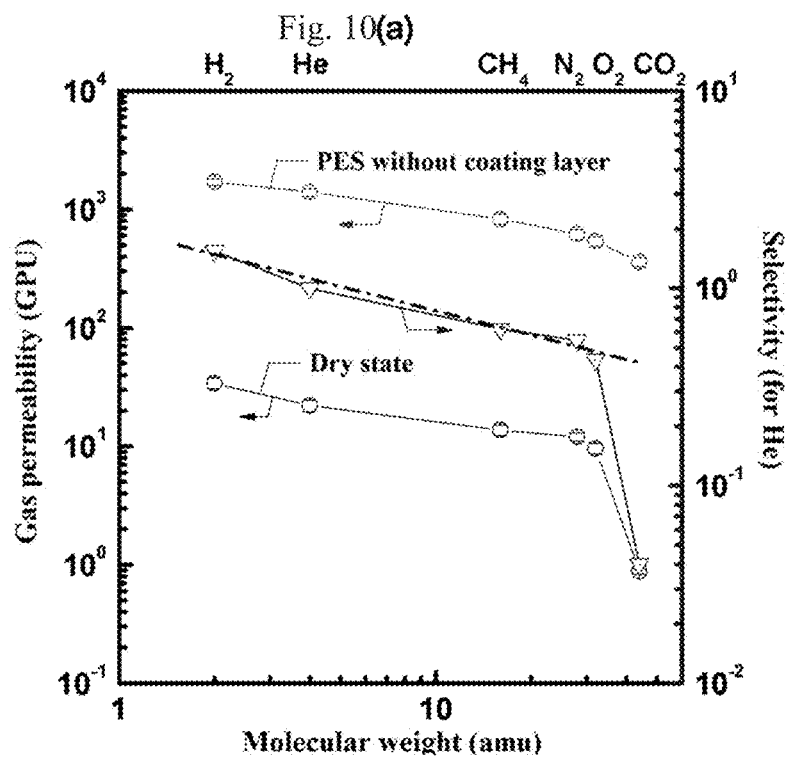
FIG. 10(a) is a graph showing the gas permeabilities and selectivities of composite separation membranes manufactured in Example 1.
Figure 10B:
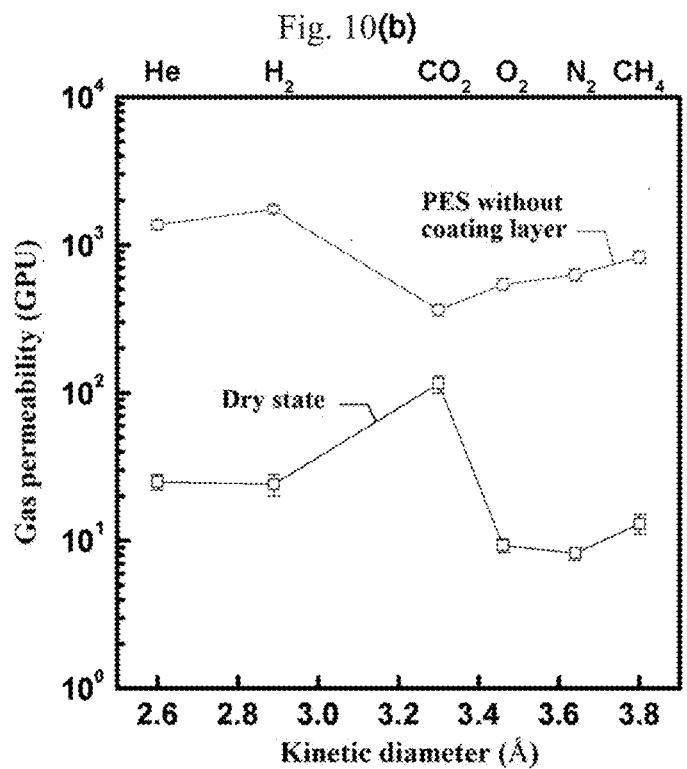
FIG. 10(b) is a graph showing the gas permeabilities and selectivities of composite separation membranes manufactured in Comparative Example 1.

As shown in (a) of FIG. 10, the selectivities of the composite separation membrane manufactured by spin coating in Example 1 were dependent on the size of gas molecules. In contrast, the selectivities of the composite separation membrane manufactured in Comparative Example 1 were inversely proportional to the molecular weight of gas molecules, as shown in (b) of FIG. 10. These results demonstrate that the selectivity of the composite separation membrane manufactured in Comparative Example 1 for carbon dioxide was lower than that of the composite separation membrane manufactured in Example 1. In conclusion, spin coating is responsible for higher selectivity of the composite separation membrane manufactured in Example 1 for carbon dioxide. A composite separation membrane was manufactured in the same manner as in Example 1, except that spray coating was performed instead of spin coating. The composite separation membrane manufactured by spray coating was confirmed to have high selectivity for carbon dioxide, which was slightly low compared to that of the composite separation membrane manufactured by spin coating in Example 1.

However, the composite separation membrane manufactured in Comparative Example 1 was confirmed to have low gas permeabilities and a low selectivity for the particular gas.

As can be seen from the results in Table 1, the composite separation membrane of Example 1 showed a higher carbon dioxide permeability than the permeabilities of other gases. As can be seen from the results in Table 2, the selectivity of the composite separation membrane manufactured in Example 1 for $O_2$ over $N_2$ ($O_2/N_2$) was higher than 1. Generally, a lower selectivity of $O_2/N_2$ than 1' (Knudsen selectivity) indicates the presence of membrane defects.

TABLE 1

| | Permeability | | | | | |
|---|---|---|---|---|---|---|
| | $H_2$ | He | $O_2$ | $N_2$ | $CH_4$ | $CO_2$ |
| Example 1 | 25 | 24 | 9.3 | 8.2 | 13 | 115 |
| Comparative Example 1 | 34 | 22 | 9.6 | 12 | 13.7 | 0.88 |

TABLE 2

| | Selectivity | | | |
|---|---|---|---|---|
| | $O_2/N_2$ | $CO_2/N_2$ | $CO_2/CH_4$ | $CO_2/H_2$ |
| Example 1 | 1.13 | 14.02 | 8.85 | 4.60 |
| Comparative Example 1 | 0.80 | 0.07 | 0.06 | 0.03 |

Although the present invention has been described herein with reference to its preferred embodiments, these embodiments do not serve to limit the invention. It should be understood that various modifications are possible without departing from the scope and spirit of the invention and such modifications are encompassed within the scope of the appended claims.

The invention claimed is:

1. A composite separation membrane comprising a porous polymer support and a graphene oxide coating layer formed on the porous polymer support,
   wherein the coating layer consists of a plurality of graphene oxide layers, each of which comprises pores through which gases pass;
   wherein the pores present in one of the graphene oxide layers are regularly arranged in a zigzag configuration at an average distance of 0.5 to 1.0 nm apart from the pores present in the graphene oxide layers formed on one or both sides of the one of the graphene oxide layers.

2. The composite separation membrane according to claim 1, wherein the pores have an average diameter of 0.5 to 1.0 nm.

3. The composite separation membrane according to claim 1, wherein the porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

4. The composite separation membrane according to claim 3, wherein the porous polymer support comprises pores whose size is from 10 nm to 100 nm.

5. The composite separation membrane according to claim 1, wherein the graphene oxide has a size in the range of 0.1 μm to 5 μm.

6. The composite separation membrane according to claim 1, wherein the graphene oxide is functionalized graphene oxide prepared by the conversion of the hydroxyl, carboxyl, carbonyl or epoxy groups present in the graphene oxide to ester, ether, amide or ammo groups.

7. The composite separation membrane according to claim 1, wherein the graphene oxide coating layer has a thickness of 3 to 20 nm.

8. A method for manufacturing a composite separation membrane, comprising: 1) dispersing graphene oxide in distilled water to obtain a dispersion; and 2) spin coating the dispersion on a porous polymer support to form a coating layer;
wherein the spin coating is performed 3 to 10 times at 2,000 to 4,000 rpm for 15 to 60 seconds each time.

9. The method according to claim 8, wherein the concentration of the graphene oxide in the dispersion obtained in step 1) is from 0.5 to 1.5 g/L.

10. The method according to claim 8, wherein the coating layer formed in step 2) has a thickness of 3 to 20 nm.

11. The method according to claim 8, further comprising subjecting the dispersion to ultrasonic disruption after step 1).

12. The method according to claim 8, wherein the porous polymer support is made of a polymer selected from the group consisting of polysulfone, polyethersulfone, polyimide, polyetherimide, polyamide, polyacrylonitrile, cellulose acetate, cellulose triacetate, and polyvinylidene fluoride.

13. The method according to claim 12, wherein the porous polymer support comprises pores whose size is from 10 nm to 100 nm.

14. The method according to claim 8, wherein the graphene oxide has a size in the range of 0.1 μm to 5 μm.

15. The method according to claim 8, wherein the graphene oxide is functionalized graphene oxide prepared by the conversion of the hydroxyl, carboxyl, carbonyl or epoxy groups present in the graphene oxide to ester, ether, amide or amino groups.

16. A membrane for water treatment comprising the composite separation membrane according to claim 1.

17. A memory device comprising the composite separation membrane according to claim 1.

18. An electrode material comprising the composite separation membrane according to claim 1.

* * * * *